(12) United States Patent
Li et al.

(10) Patent No.: US 11,813,591 B2
(45) Date of Patent: Nov. 14, 2023

(54) ETHYLENE DEGRADATION CATALYST AND PREPARATION METHOD AND USE THEREOF (71) Applicants: China Energy Investment Corporation Limited, Beijing (CN); National Institute of Clean-and-Low-Carbon Energy, Beijing (CN)

(72) Inventors: Ge Li, Beijing (CN); Baodong Wang, Beijing (CN); Ziran Ma, Beijing (CN); Jing Ma, Beijing (CN); Shengpan Peng, Beijing (CN); Hongyan Wang, Beijing (CN)

(73) Assignees: CHINA ENERGY INVESTMENT CORPORATION LIMITED, Beijing (CN); NATIONAL INSTITUTE OF CLEAN-AND-LOW-CARBON ENERGY, Beijing (CN)

( * ) Notice: Subject to any disclaimer, the term of this patent is extended or adjusted under 35 U.S.C. 154(b) by 0 days.

(21) Appl. No.: 17/559,673

(22) Filed: Dec. 22, 2021

(65) Prior Publication Data
US 2023/0149903 A1 May 18, 2023

(30) Foreign Application Priority Data

Nov. 16, 2021 (CN) .......................... 202111356393.6

(51) Int. Cl.
| | |
|---|---|
| *B01J 21/06* | (2006.01) |
| *B01J 35/00* | (2006.01) |
| *B01J 35/02* | (2006.01) |
| *B01J 6/00* | (2006.01) |
| *B01J 37/04* | (2006.01) |

(Continued)

(52) U.S. Cl.
CPC ............. *B01J 21/063* (2013.01); *B01J 6/001* (2013.01); *B01J 23/02* (2013.01); *B01J 35/0006* (2013.01); *B01J 35/023* (2013.01); *B01J 37/04* (2013.01); *B01J 37/08* (2013.01); *C22B 1/02* (2013.01); *C22B 3/08* (2013.01); *C22B 34/125* (2013.01); *C22B 34/1213* (2013.01); *B01J 37/06* (2013.01); *B82Y 40/00* (2013.01); *F01N 3/0835* (2013.01);
(Continued)

(58) Field of Classification Search
CPC . B01J 21/063; B01J 6/001; B01J 23/02; B01J 35/0006; B01J 35/023; B01J 37/04; B01J 37/08; B01J 37/06; C22B 1/02; C22B 3/08; C22B 34/1213; C22B 34/125; B82Y 40/00; F01N 3/0835; F01N 3/2066; F01N 2250/12
See application file for complete search history.

(56) References Cited

U.S. PATENT DOCUMENTS 4,950,763 A * 8/1990 Schommer ............... B01J 23/04
546/314

OTHER PUBLICATIONS

Yun et al. (Surface Hydroxyl Chemistry of Titania- and Alumina-Based Supports: Quantitative Titration and Temperature Dependence of Surface Brønsted Acid-Base Parameters, ACS Applied Materials and Interfaces, 2023) (Year: 2023).*

(Continued)

*Primary Examiner* — Colin W. Slifka
*Assistant Examiner* — Logan Edward Laclair
(74) *Attorney, Agent, or Firm* — Calfee, Halter & Griswold LLP (57) ABSTRACT The present disclosure discloses an ethylene degradation catalyst and a preparation method and a use thereof.

20 Claims, 5 Drawing Sheets (51) Int. Cl.
*B01J 37/08* (2006.01)
*C22B 1/02* (2006.01)
*C22B 3/08* (2006.01)
*C22B 34/12* (2006.01)
*B01J 23/02* (2006.01)
*B01J 37/06* (2006.01)
*B82Y 40/00* (2011.01)
*F01N 3/08* (2006.01)
*F01N 3/20* (2006.01)

(52) U.S. Cl.
CPC ........ *F01N 3/2066* (2013.01); *F01N 2250/12* (2013.01)

(56) References Cited

OTHER PUBLICATIONS

Soria et al. (The effect of the surface disordered layer on the photoreactivity of titania nanoparticles, Applied Catalysis B: Environmental, 2017). (Year: 2017).*

* cited by examiner

ETHYLENE DEGRADATION CATALYST AND PREPARATION METHOD AND USE THEREOF

PRIORITY CLAIM & CROSS REFERENCE

The application claims priority to Chinese Application No. 202111356393.6, filed on Nov. 16, 2021, entitled "ethylene degradation catalyst and preparation method and use thereof", which is herein specifically and entirely incorporated by reference.

FIELD

The present disclosure relates to the technical field of catalytic degradation of ethylene, and in particular to an ethylene degradation catalyst and a preparation method and a use thereof.

BACKGROUND

Volatile Organic Compounds (VOCs) are important precursors for the formation of PM2.5 and $O_3$. In order to further improve air quality, the comprehensive treatment of the coal chemical industry and other key industries of emission of VOCs should be enhanced. The current technologies for treatment of VOCs are mainly divided into three categories, namely adsorption recovery technology, combustion technology, adsorption concentration+combustion technology, wherein the combustion technology is used for treatment of VOCs lacking a recovery value. For example, volatile organic compounds from the coal chemical industry are mainly derived from coal gasification process, and the process of washing tail gas with low temperature methanol; the VOCs have the characteristics such as a wide variety of VOCs, low recovery value, and high air volume. The combustion technology can oxidize VOCs to harmless emissions of $CO_2$ and $H_2O$.

Catalytic combustion is one of the key means in the combustion technology, wherein the key nodes of catalytic combustion technology include the design and preparation of catalysts for oxidation of VOCs. The catalysts for oxidation of VOCs are typically composed of two parts, namely a carrier and an active ingredient (noble metal). Ethylene is a common VOC gas of the coal chemical industry, the commercially available catalysts for the oxidation of ethylene are mainly Pt/γ-$Al_2O_3$ catalysts. However, the active ingredient noble metal is expensive and requires a long supply cycle, and is essentially dependent on imports from foreign countries. In addition, the commercially available Pt/γ-$Al_2O_3$ catalysts suffer from the defects such as undesired thermal stability, poor resistance to catalyst poisoning.

To sum up, it is imperative to develop a novel, low cost, anti-poisoning, stable and environmentally friendly catalyst that effectively reduces the atmospheric pollutants VOCs.

SUMMARY

An object of the present disclosure is to overcome the problem in the prior art that the ethylene degradation catalyst requires a noble metal as an active ingredient, and the present disclosure provides an ethylene degradation catalyst and a preparation method and a use thereof, wherein the ethylene degradation catalyst can achieve a high catalytic activity for ethylene.

The inventors of the present disclosure have discovered during the course of research that, when the composition of an ethylene degradation catalyst comprises $K_2O$ and $Na_2O$, and $TiO_2$ crystals have an anatase type, and the surface of $TiO_2$ crystals is covered with a $TiO_2$ disordered layer containing surface hydroxyl groups and $Ti^{3+}$, the catalyst can effective decompose ethylene into $CO_2$ and $H_2O$, without using a noble metal contained in the catalyst as an active ingredient, thus obtain the present disclosure.

In order to achieve the above object, a first aspect of the present disclosure provides an ethylene degradation catalyst, comprising $TiO_2$ crystals and auxiliary agents; wherein the crystalline form of $TiO_2$ crystal is an anatase type, and the surface of $TiO_2$ crystal is covered with a $TiO_2$ disordered layer containing surface hydroxyl groups.

In a second aspect, the present disclosure provides a method of preparing an ethylene degradation catalyst, comprising the following steps:

(1) mixing a titanium source powder with an acid, and roasting an obtained mixture;

(2) subjecting a product obtained from the roasting to water leaching, and subsequently to a solid-liquid separation to obtain a Ti-containing filtrate;

(3) subjecting the filtrate to hydrolysis and aging to obtain a metatitanic acid colloid comprising auxiliary agent elements which contain Na and K;

(4) subjecting the metatitanic acid colloid to water washing, drying and calcination, to obtain nano-$TiO_2$ powder;

(5) subjecting the nano-$TiO_2$ powder to hydrogenation, so as to prepared the ethylene degradation catalyst;

wherein the titanium source powder is selected from the group consisting of spent SCR denitration catalysts containing $Na_2O$ and $K_2O$.

In a third aspect, the present disclosure provides an ethylene degradation catalyst prepared with the aforesaid method.

In a fourth aspect, the present disclosure provides a use of the aforesaid ethylene degradation catalyst in the degradation of ethylene.

Through the aforementioned technical scheme, the present disclosure has the favorable effects as follows:

(1) The preparation method of the ethylene degradation catalyst of the present disclosure uses the spent SCR catalyst containing $Na_2O$ and $K_2O$ auxiliary agents as raw materials, can rationally utilize the elements contained in the obtained anatase type $TiO_2$ prepared with the sulfuric acid method, so as to provide the acidic site for hydrogenation of $TiO_2$. In addition, the structural defect of the prepared $TiO_2$ crystal can rationally regulate its oxidation-reduction property.

(2) The ethylene degradation catalyst of the present disclosure does not require a use of transition metals or noble metals as active ingredients, thereby eliminating the need to deal with problems of catalyst poisoning and aging during the process of catalytic degradation of ethylene, and the catalyst can be easily regenerated after deactivation.

DESCRIPTION OF THE REFERENCE SIGNS

1. $TiO_2$ powder
2. ethylene degradation catalyst

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides an ethylene degradation catalyst, comprising $TiO_2$ crystals and auxiliary agents; wherein the crystalline form of $TiO_2$ crystal is an anatase type, and the surface of $TiO_2$ crystal is covered with a $TiO_2$ disordered layer containing surface hydroxyl groups.

The ethylene degradation catalyst provided by the present disclosure comprises $TiO_2$ crystals having a specific structure and auxiliary agents, it does not comprise a noble metal as an active ingredient, and can produce better effect of catalytic degradation of ethylene.

In some embodiments of the present disclosure, it is preferable that the catalyst comprises $TiO_2$ in an amount of 99.9-99.99 wt %, based on the total weight of the catalyst.

In some embodiments of the present disclosure, the catalyst further comprises auxiliary agents, which can advantageously promote the technical effect of increasing the catalytic degradation of ethylene. Preferably, the auxiliary agents comprise $K_2O$ and $Na_2O$, the catalyst comprises $K_2O$ in an amount of 0.002-0.006 wt % and $Na_2O$ in an amount of 0.006-0.098 wt %, based on the total weight of the catalyst.

In some embodiments of the present disclosure, the catalyst may further comprise a pore structure that is favorable for catalytic degradation reaction of ethylene. Preferably, the catalyst has a specific surface area of 80-120 $m^2/g$, a pore volume of 0.2-0.8 $cm^3/g$, and a pore diameter of 8-13 nm.

In some embodiments of the present disclosure, it is preferable that the $TiO_2$ disordered layer has a thickness of 1.8-3 nm. The structural defects formed by $TiO_2$ crystals in the catalyst may form the $TiO_2$ disordered layer on the surface of the $TiO_2$ crystals, and can contain the surface hydroxyl group.

In some embodiments of the present disclosure, it is preferable that a molar percentage of the $Ti^{3+}$ of the $TiO_2$ disordered layer in Ti elements is within a range of 2.15%-10.37%, more preferably 5.15%-8.66%. The $TiO_2$ crystals of the present disclosure contain the above-mentioned defects and the amount of the defects is calculated based on $Ti^{3+}$, and when the molar percentage falls in the above range, those skilled in the art may control the catalyst to more appropriately match the above-mentioned auxiliary agents, and exhibit desired catalytic activity for catalytic degradation reaction of ethylene. The amount of $Ti^{3+}$ can be determined by X-ray photoelectron energy spectrum analysis method.

In the present disclosure, the surface hydroxyl groups are hydroxyl groups attached to $Ti^{3+}$, and may be represented as Ti—OH.

In the present disclosure, the ethylene degradation catalyst has an appearance of an earth yellow color and a morphology of a spherical shape.

Figure 1:
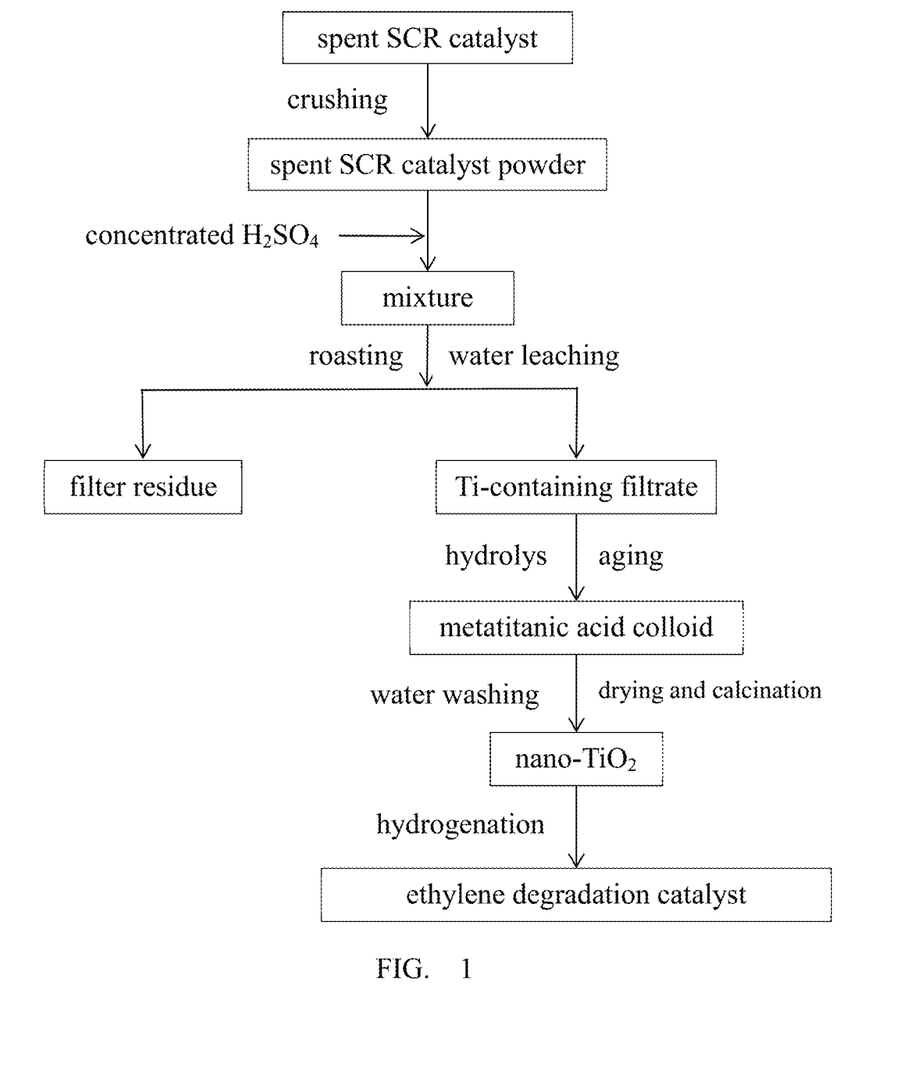
FIG. 1 is a schematic diagram of the technological process illustrating a method for preparing an ethylene degradation catalyst of the present disclosure.

In a second aspect, the present disclosure provides a method of preparing an ethylene degradation catalyst, as shown in FIG. 1, wherein the method comprises the following steps:

(1) mixing a titanium source powder with an acid, and roasting an obtained mixture;

(2) subjecting a product obtained from the roasting process to water leaching, and subsequently to a solid-liquid separation to obtain a Ti-containing filtrate;

(3) subjecting the filtrate to hydrolysis and aging to obtain a metatitanic acid colloid comprising auxiliary agent elements which contain Na and K;

(4) subjecting the metatitanic acid colloid to water washing, drying and calcination, to obtain nano-$TiO_2$ powder;

(5) subjecting the nano-$TiO_2$ powder to hydrogenation, so as to prepared the ethylene degradation catalyst;

wherein the titanium source powder is selected from the group consisting of spent SCR denitration catalysts containing $Na_2O$ and $K_2O$.

In some embodiments of the present disclosure, steps (1) and (2) can be used to extract mainly Ti elements and to obtain the soluble Ti-containing compounds, and can extract Na and K elements as well. Preferably, the acid is concentrated sulfuric acid; preferably, the acid has a concentration of 85-92 wt %, more preferably 88-91 wt %. The requirement of extracting the beneficial elements dominated by Ti elements is fulfilled.

In some embodiments of the present disclosure, preferably, the conditions of mixing include a temperature of 20-30° C. and a time of 2-6 hours; more preferably, a temperature of 22-28° C. and a time of 3-5 hours.

In some embodiments of the present disclosure, it is preferable that the mass ratio of the titanium source powder to the acid is 1:(1.5-2). Wherein, the titanium source powder may further comprise an auxiliary agent, preferably comprising $Na_2O$ and $K_2O$, more preferably, the titanium source powder comprises $K_2O$ in an amount of 0.1-0.3 wt % and $Na_2O$ in an amount of 0.2-0.8 wt %, based on the total weight of the titanium source powder, it can ensure that the finally prepared ethylene degradation catalyst comprises the defined amount of $Na_2O$ and $K_2O$, to further promote the catalytic activity for catalytic degradation of ethylene.

In some embodiments of the present disclosure, it is preferable that the roasting temperature is within a range of 150-300° C. and the roasting time is 30-90 min.

In some embodiments of the present disclosure, it is preferred that the titanium source powder has an average particle size of 10-1,000 μm, preferably 50-200 μm. The above conditions can facilitate a more efficient extraction of the Ti, Na, K elements to obtain the soluble Ti-containing compounds.

In some embodiments of the present disclosure, step (2) may achieve dissolution of the Ti element, and may also dissolve auxiliary agent elements such as Na and K. Preferably, the water leaching conditions comprise a temperature of 60-120° C. and a time of 60-180 min; and more preferably, a temperature of 80-100° C. and a time of 80-120 min.

In some embodiments of the present disclosure, it is preferable that the mass ratio of the product to the water used in the water leaching is 1:(2-6), more preferably 1:(3-5).

In some embodiments of the present disclosure, step (3) may be mainly used for precipitation of Ti. Preferably, the hydrolysis temperature is within a range of 80-110° C., more preferably 85-105° C.; and the hydrolysis time is within a range of 2-5 h, more preferably 2.5-4 h.

In some embodiments of the present disclosure, the hydrolysis is followed by an aging treatment, it is preferable that the aging time is within a range of 15-30 h, more preferably 16-26 h, and the aging temperature is within a range of 10-50° C., more preferably 20-35° C.

In the present disclosure, the aged material is subjected to suction filtration, separation and water washing, to obtain a metatitanic acid colloid containing an auxiliary agent element.

In some embodiments of the present disclosure, step (4) is carried out to purify the metatitanic acid colloid, for example, the step may be used for removing impurities and dehydration. The water washing process is used to remove impurities from the metatitanic acid colloid by a process comprising mixing the metatitanic acid colloid with water, stirring the mixture, filtering and removing the filtrate. Water washing and filtering may be performed for several times. Preferably, the drying temperature is within a range of 65-95° C. and the drying time is 60-120 min.

In some embodiments of the present disclosure, it is preferable that the calcination temperature is within a range of 450-700° C., the calcination time is 2-8 h, and the temperature rise rate is 5-10° C./min. Preferably, the calcination is carried out for 5-6 h at a temperature of 500-600° C. and the temperature rise rate of 5-7° C./min, and the effect is better.

In the present disclosure, the crystalline form of the nano-$TiO_2$ powder obtained after calcination is an anatase form.

Preferably, the nano-$TiO_2$ powder further contains auxiliary agents, such as $Na_2O$ and $K_2O$, which are dispersed in the nano-$TiO_2$ powder.

In some embodiments of the present disclosure, the nano-$TiO_2$ powder is subjected to surface hydrogenation and reduction in step (5), and the defective structures are generated after the hydrogenation process. Preferably, the hydrogenation condition comprises a hydrogenation temperature of 400-550° C., a hydrogenation temperature rise rate of 5-10° C./min, a hydrogenation time of 2-12 h, a hydrogen concentration of 90-100 vol %, and a hydrogen flow rate of 100-300 mL/min. The $TiO_2$ powder is heated from room temperature to the hydrogenation temperature at the hydrogenation temperature rise rate in the presence of hydrogen at a set flow rate, and the hydrogenation is then performed at constant temperature. Preferably, the hydrogenation is performed at 420-460° C. under normal pressure for 4-12 h and the hydrogen flow rate of 100-150 mL/min in an atmosphere of 100 vol % $H_2$, the effect is more desirable.

In a third aspect, the present disclosure provides an ethylene degradation catalyst prepared with the aforesaid method.

Preferably, the ethylene degradation catalyst prepared with the above-described process comprises $TiO_2$ crystals and auxiliary agents, wherein the catalyst comprises $K_2O$ in an amount of 0.002-0.006 wt % and $Na_2O$ in an amount of 0.006-0.098 wt %, based on the total weight of the catalyst. The crystalline form of the $TiO_2$ crystal is an anatase form, the catalyst comprises $TiO_2$ in an amount of 99.9-99.99 wt %, and the surface of $TiO_2$ crystal is covered with a $TiO_2$ disordered layer. The $TiO_2$ disordered layer has a thickness of 1.8-3 nm; a molar percentage of the $Ti^{3+}$ of the $TiO_2$ disordered layer in Ti elements is within a range of 2.15%-10.37%, preferably 5.15%-8.66%. The catalyst has a specific surface area of 80-120 $m^2/g$, a pore volume of 0.2-0.8 $cm^3/g$, and a pore diameter of 8-13 nm.

In a fourth aspect, the present disclosure provides a use of the aforesaid ethylene degradation catalyst in the degradation of ethylene.

According to the present disclosure, the use specifically comprises, the catalytic degradation reaction of ethylene is performed by contacting an organic volatile gas containing ethylene with the ethylene degradation catalyst of the present disclosure.

According to the present disclosure, the use is implemented under the temperature conditions, which may be within a range of 100-500° C.

According to the present disclosure, the volume concentration of ethylene in the organic volatile gas may be within a range of 10-1,000 ppm.

According to the present disclosure, the hourly volume space velocity of the organic volatile gas is 4,000-40,000 $h^{-1}$.

The present disclosure will be described in detail below with reference to examples.

In the following Examples and Comparative examples:

(1) The crystal structure of the prepared ethylene degradation catalyst was measured by the X-Ray Diffraction (XRD) analysis using the D8 ADVANCE manufactured by Bruker SA in Germany, and the testing and scanning rate was within a range of 0.5°/min to 5°/min.

(2) The pore structure and mesopore pore diameter of the prepared ethylene degradation catalyst were measured through the $N_2$ adsorption method, using the ASAP 2020 physical adsorption instrument manufactured by the Micromeritics Corp. in USA, and the adsorption medium was $N_2$.

(3) The morphology of the prepared ethylene degradation catalyst was measured through the Transmission Electron Microscope (TEM) using a transmission electron microscope model JEM ARM 200F manufactured by the JEOL corporation in Japan.

(4) The Electron Paramagnetic Resonance (EPR) image analysis was performed by using an electron paramagnetic resonance spectrometer.

(5) The titanium source powder was the spent SCR catalyst with an average particle size of 74 μm, and the chemical composition was determined by the XRF fluorescence analysis method (RIPP 117-90 Standard method, compiled by the Research Institution of Petroleum Processing in China), and the results were shown in Table 1. The ingredients of the catalyst and contents thereof were also measured by the XRF fluorescence analysis method.

TABLE 1

| | Al$_2$O$_3$ | SiO$_2$ | TiO$_2$ | Fe$_2$O$_3$ | FeO | K$_2$O | Na$_2$O | MnO | MgO | Other impurities |
|---|---|---|---|---|---|---|---|---|---|---|
| Ingredients (wt %) | 1.23 | 3.55 | 46.8 | 3.05 | 35.75 | 0.134 | 0.5638 | 0.64 | 4.52 | 3.762 |

Example 1

(1) The spent SCR catalyst (with a particle size of 120 μm) and the concentrated sulfuric acid (with a concentration of 90 wt %) were blended according to a mass ratio of 1:1.8 to obtain a mixture; the mixture was subjected to roasting at a temperature of 180° C. for 1 h.

(2) The product obtained from roasting was subjected to water leaching at a temperature of 100° C. for 100 min according to a mass ratio of 1:4 between the product and water, the mixture was subjected to a solid-liquid separation to obtain a Ti-containing filtrate;

(3) Subjecting the filtrate to hydrolysis and aging in sequence, under the hydrolysis conditions consisting of a hydrolysis temperature of 100° C. and a hydrolysis time of 3 h, and the aging conditions consisting of an aging temperature of 25° C. and an aging time of 20 h, the obtained solid phase product was analyzed to be a metatitanic acid colloid comprising auxiliary agent, the auxiliary agent contained Na$_2$O and K$_2$O;

(4) The metatitanic acid colloid was subjected to water washing, the solid obtained from separation was subjected to drying at 80° C. for 60 min, heating at a temperature rise rate of 7° C./min and finally subjected to calcination in a muffle furnace at 500° C. for 6 h, so as to obtain the nano-TiO$_2$ powder, upon analysis, the particle size of the nano-TiO$_2$ powder was about 30 nm, the crystalline form the nano-TiO$_2$ powder was an anatase type.

(5) The nano-TiO$_2$ powder was subjected to hydrogenation in a tube furnace under a pressure of 0.1 MPa, the hydrogen concentration of 100 vol %, the hydrogen flow rate of 120 mL/min, the hydrogenation temperature rise rate of 10° C./min, so as to reach the hydrogenation temperature of 420° C., the hydrogenation with the thermal insulation was performed for 12 h, and then cooled to room temperature, the ethylene degradation catalyst was prepared and denoted as T-1.

Figure 6:
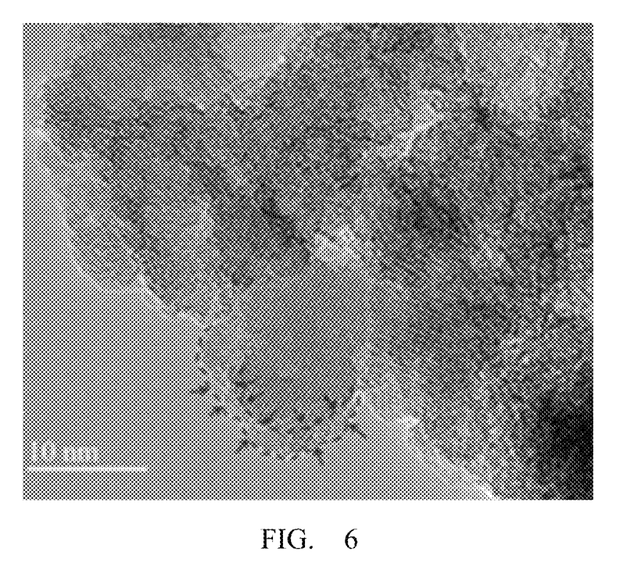
FIG. 6 is a Transmission Electron Microscope (TEM) diagram of the ethylene degradation catalyst prepared in Example 1 of the present disclosure.

The obtained ethylene degradation catalyst was subjected to the XRD analysis, the ethylene degradation catalyst comprised TiO$_2$ crystals with the crystalline form of an anatase type; as can be seen from the TEM diagram of FIG. 6, the catalyst comprised the TiO$_2$ disordered layer having a thickness of 2.74 nm, a molar percentage of the Ti$^{3+}$ of the TiO$_2$ disordered layer was 6.73%. The catalyst further comprised K$_2$O and Na$_2$O, the ingredients were shown in Table 2.

Figure 2:
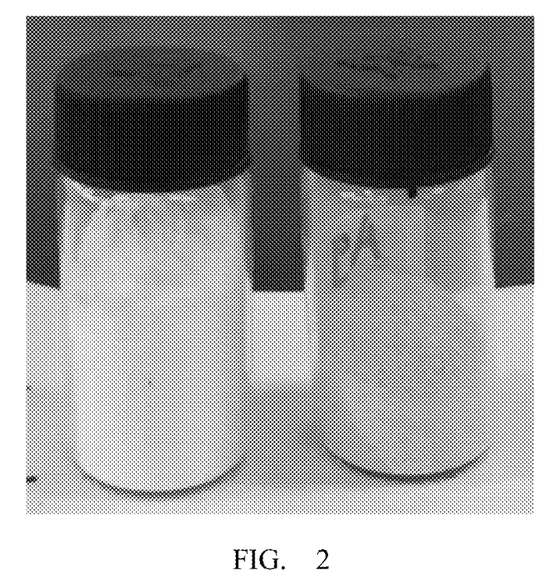
FIG. 2 is a graphic representation comparing the appearance of the ethylene degradation catalyst prepared in Example 1 of the present disclosure with the $TiO_2$ powder.

FIG. 2 was a graphic representation comparing the appearance of the ethylene degradation catalyst prepared in Example 1 of the present disclosure with the TiO$_2$ powder; the figure illustrated that the TiO$_2$ powder was a white powder, while the ethylene degradation catalyst of the present disclosure had an appearance of earth yellow color and a morphology of a spherical shape.

Figure 3:
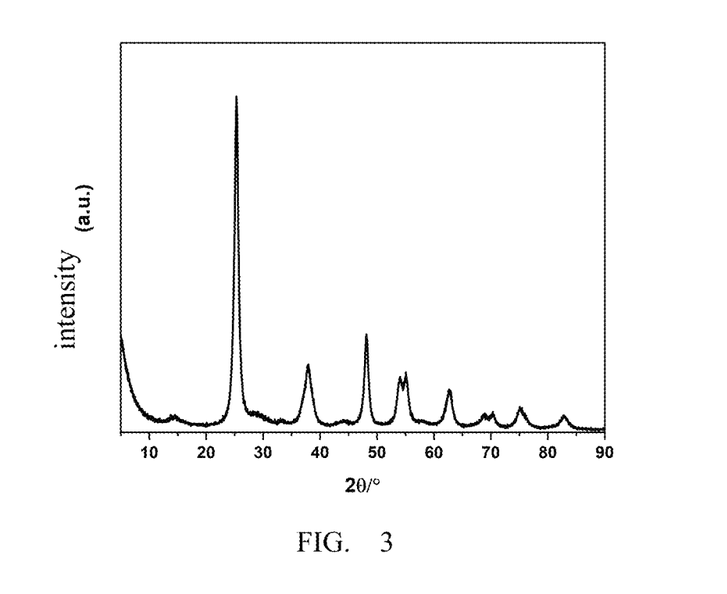
FIG. 3 illustrates a diagram comparing the X-ray diffraction pattern of the ethylene degradation catalyst prepared in Example 1 of the present disclosure with the $TiO_2$ powder.

FIG. 3 illustrated a diagram comparing the X-ray diffraction pattern of the ethylene degradation catalyst prepared in Example 1 of the present disclosure with the TiO$_2$ powder; as can be seen from FIG. 3, all the peaks of the ethylene degradation catalyst of the present disclosure coincided with those of the TiO$_2$ powder, there was no impurities, the result was consistent with the XRD spectrum of the mesoporous TiO$_2$ reported by the literatures. In addition, the XRD diffraction peaks of the ethylene degradation catalyst were obviously broader and lower, indicating minor modification of the crystallite size and structure of the microcrystalline, the reasons resided in that the trivalent titanium and oxygen vacancies were generated during the hydrogenation and reduction process.

Figure 4:
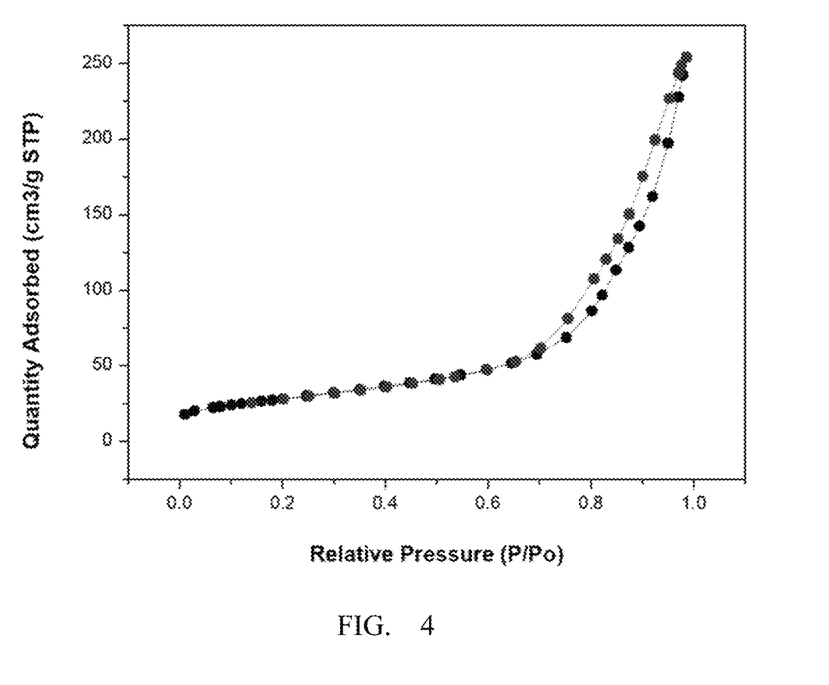
FIG. 4 illustrates a comparative graph of nitrogen adsorption-desorption isotherms of the ethylene degradation catalyst prepared in Example 1 of the present disclosure.

FIG. 4 illustrated a comparative graph of nitrogen adsorption-desorption isotherms of the ethylene degradation catalyst prepared in Example 1 of the present disclosure, there were two curves, wherein one was an adsorption curve, another was desorption curve; FIG. 4 showed that the ethylene degradation catalyst of the present disclosure was the Langmuir IV type and belonged to the typical adsorption curves for the mesoporous substances, i.e. a large hysteresis loop was present along with an increase of the partial pressure of adsorption. In addition, the relative pressure p/p$_0$ value corresponding to the growth spurt in the adsorption isotherm indicated the pore size of the sample, and it can be seen from the pore size distribution in FIG. 4 that the ethylene degradation catalyst of the present disclosure had highly ordered mesoporous structure, uniform pore size distribution and ordered channels.

Figure 5:
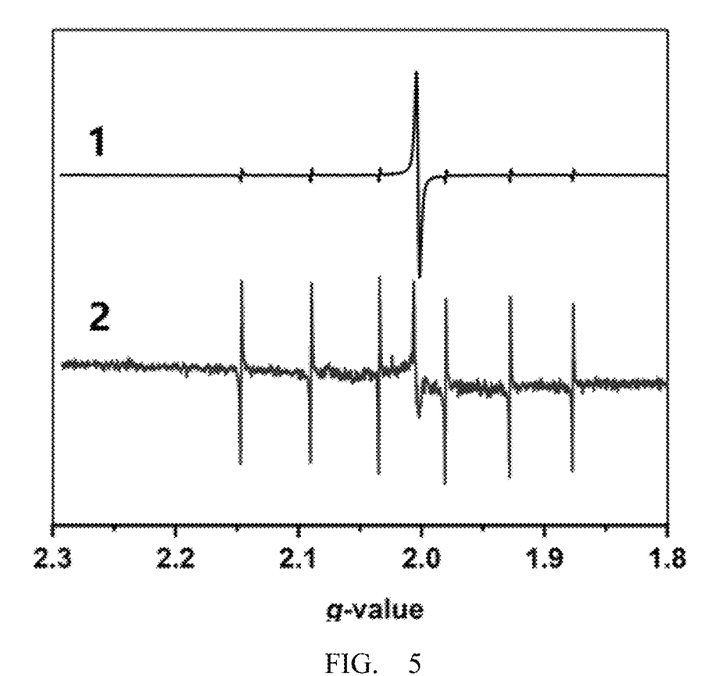
FIG. 5 illustrates a comparison diagram of the Electron Paramagnetic Resonance (EPR) of the ethylene degradation catalyst prepared in Example 1 of the present disclosure with the pure nano-$TiO_2$.

FIG. 5 illustrated a comparison diagram of the Electron Paramagnetic Resonance (EPR) of the ethylene degradation catalyst prepared in Example 1 of the present disclosure with the TiO$_2$ powder; the signal peaks at the g-value less than 2 were the signal peaks of oxygen vacancies (V$_O$*) Ti$^{3+}$; as can be seen from FIG. 5, curve 1 represented the TiO$_2$ powder, curve 2 represented the ethylene degradation catalyst of the present disclosure, and there were more signals peaks of oxygen vacancies (V$_O$*) Ti$^{3+}$ produced after hydrogenation; it demonstrated that the hydrogenation caused that more oxygen vacancies were generated on the surface of the material, which was more conducive to proceeding of the denitration reaction.

FIG. 6 was a Transmission Electron Microscope (TEM) diagram of the ethylene degradation catalyst prepared in Example 1 of the present disclosure; as can be seen from FIG. 6 (multiple dotted lines and arrows were marked below the middle part): the edges of the TiO$_2$ crystal nucleus was etched to form a thin disordered layer, further indicating that TiO$_2$ was successfully hydrogenated.

Figure 7:
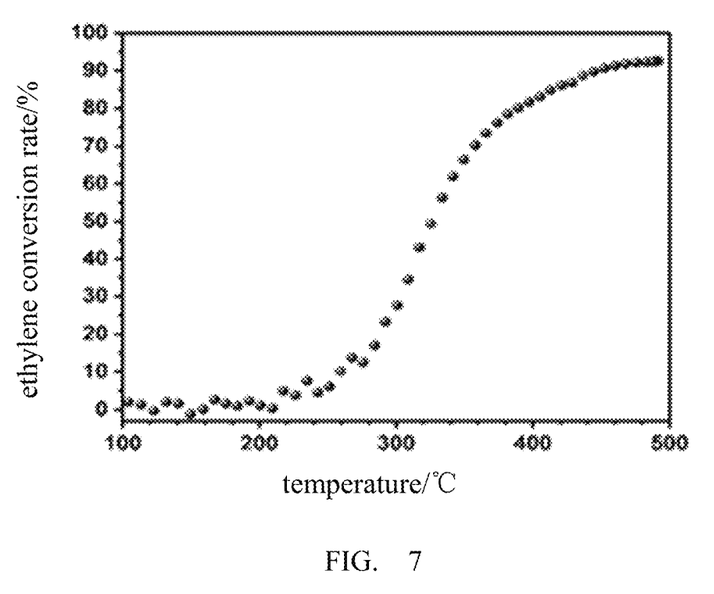
FIG. 7 is a graph illustrating the relationship between temperature and ethylene conversion rate for the ethylene degradation catalyst prepared in Example 1 of the present disclosure.

FIG. 7 illustrated a reaction activity graph for the ethylene degradation catalyst prepared in Example 1 of the present disclosure. As can be seen from FIG. 7, the ethylene degradation catalyst had an ethylene degradation activity greater than 50% at a temperature of 325-500° C., and the ethylene degradation catalyst had an ethylene degradation activity greater than 90% at a temperature higher than 450° C.

Example 2

(1) The spent SCR catalyst (with a particle size of 500 μm) and the concentrated sulfuric acid (with a concentration of 88 wt %) were blended according to a mass ratio of 1:1.5 to obtain a mixture; the mixture was subjected to roasting at a temperature of 150° C. for 0.5 h.

(2) The product obtained from roasting was subjected to water leaching at a temperature of 90° C. for 80 min according to a mass ratio of 1:3 between the product and water, the mixture was subjected to a solid-liquid separation to obtain a Ti-containing filtrate;

(3) Subjecting the filtrate to hydrolysis and aging in sequence, under the hydrolysis conditions consisting of a hydrolysis temperature of 85° C. and a hydrolysis time of 2.5 h, and the aging conditions consisting of an aging temperature of 20° C. and an aging time of 16 h, the obtained solid phase product was analyzed to be a metatitanic acid colloid comprising auxiliary agent, the auxiliary agent contained $Na_2O$ and $K_2O$;

(4) She metatitanic acid colloid was subjected to water washing, the solid obtained from separation was subjected to drying at 95° C. for 120 min, heating at a temperature rise rate of 5° C./min and finally subjected to calcination in a muffle furnace at 600° C. for 5 h, so as to obtain the nano-$TiO_2$ powder, upon analysis, the particle size of the nano-$TiO_2$ powder was about 20 nm, the crystalline form the nano-$TiO_2$ powder was an anatase type.

(5) The nano-$TiO_2$ powder was subjected to hydrogenation in a tube furnace under a pressure of 0.1 MPa, the hydrogen concentration of 100 vol %, the hydrogen flow rate of 100 mL/min, the hydrogenation temperature rise rate of 5° C./min, so as to reach the hydrogenation temperature of 430° C., the hydrogenation with the thermal insulation was performed for 4 h, and then cooled to room temperature, the ethylene degradation catalyst was prepared and denoted as T-2.

The catalyst T-2 was analyzed and the results were shown in Table 2. The comparisons of appearance, XRD, nitrogen adsorption-desorption isotherm, EPR, TEM between the catalyst and the $TiO_2$ powder were performed, and the results obtained from the photographs or curves or spectrogram were similar to those obtained in Example 1.

Example 3

(1) The spent SCR catalyst (with a particle size of 200 μm) and the concentrated sulfuric acid (with a concentration of 91 wt %) were blended according to a mass ratio of 1:2 to obtain a mixture; the mixture was subjected to roasting at a temperature of 300° C. for 1.5 h.

(2) The product obtained from roasting was subjected to water leaching at a temperature of 80° C. for 120 min according to a mass ratio of 1:5 between the product and water, the mixture was subjected to a solid-liquid separation to obtain a Ti-containing filtrate;

(3) Subjecting the filtrate to hydrolysis and aging in sequence, under the hydrolysis conditions consisting of a hydrolysis temperature of 105° C. and a hydrolysis time of 4 h, and the aging conditions consisting of an aging temperature of 35° C. and an aging time of 26 h, the obtained solid phase product was analyzed to be a metatitanic acid colloid comprising auxiliary agent, the auxiliary agent contained $Na_2O$ and $K_2O$;

(4) The metatitanic acid colloid was subjected to water washing, the solid obtained from separation was subjected to drying at 65° C. for 100 min, heating at a temperature rise rate of 6° C./min and finally subjected to calcination in a muffle furnace at 550° C. for 5 h, so as to obtain the nano-$TiO_2$ powder, upon analysis, the particle size of the nano-$TiO_2$ powder was about 40 nm, the crystalline form the nano-$TiO_2$ powder was an anatase type.

(5) The nano-$TiO_2$ powder was subjected to hydrogenation in a tube furnace under a pressure of 0.1 MPa, the hydrogen concentration of 100 vol %, the hydrogen flow rate of 150 mL/min, the hydrogenation temperature rise rate of 8° C./min, so as to reach the hydrogenation temperature of 460° C., the hydrogenation with the thermal insulation was performed for 9 h, and then cooled to room temperature, the ethylene degradation catalyst was prepared and denoted as T-3.

The catalyst T-3 was analyzed and the results were shown in Table 2. The comparisons of appearance, XRD, nitrogen adsorption-desorption isotherm, EPR, TEM between the catalyst and the $TiO_2$ powder were performed, and the results obtained from the photographs or curves or spectrogram were similar to those obtained in Example 1.

Example 4

The catalyst was prepared according to the same method as that of Example 1, except that the "hydrogenation temperature of 400° C." was replaced by the "hydrogenation temperature of 420° C.". The prepared ethylene degradation catalyst was denoted as T-4.

The catalyst T-4 was analyzed and the results were shown in Table 2. The comparisons of appearance, XRD, nitrogen adsorption-desorption isotherm, EPR, TEM between the catalyst and the $TiO_2$ powder were performed, and the results obtained from the photographs or curves or spectrogram were similar to those obtained in Example 1.

Example 5

The catalyst was prepared according to the same method as that of Example 1, except that the "hydrogenation time of 2 h" was replaced by the "hydrogenation time of 12 h". The prepared ethylene degradation catalyst was denoted as T-5.

The catalyst T-5 was analyzed and the results were shown in Table 2. The comparisons of appearance, XRD, nitrogen adsorption-desorption isotherm, EPR, TEM between the catalyst and the $TiO_2$ powder were performed, and the results obtained from the photographs or curves or spectrogram were similar to those obtained in Example 1.

Comparative Example 1

The commercially available $TiO_2$ was used, the parameters of the prepared catalyst were shown in Table 2.

Comparative Example 2

The catalyst was prepared according to the same method as that of Example 1, except that the "hydrogenation concentration of 50 vol %" was replaced by the "hydrogenation concentration of 100 vol %". The parameters of the prepared catalyst were shown in Table 2.

Comparative Example 3

The catalyst was prepared according to the same method as that of Example 1, except that the "hydrogenation time of 0.5 h" was replaced by the "hydrogenation time of 12 h", the "hydrogenation temperature of 200° C." was replaced by the "hydrogenation temperature of 420° C.". The parameters of the prepared catalyst were shown in Table 2.

TABLE 2

| Numbers | Content of ingredients (wt %) | | | Thickness of the disordered layer (nm) | $Ti^{3+}/Ti$ (mol %) |
| --- | --- | --- | --- | --- | --- |
| | $TiO_2$ | $K_2O$ | $Na_2O$ | | |
| Example 1 | 99.99 | 0.004 | 0.006 | 2.49 | 6.89 |
| Example 2 | 99.92 | 0.006 | 0.094 | 2.36 | 8.16 |
| Example 3 | 99.96 | 0.003 | 0.037 | 2.45 | 7.58 |
| Example 4 | 99.90 | 0.002 | 0.098 | 1.87 | 3.58 |
| Example 5 | 99.93 | 0.003 | 0.067 | 2.09 | 4.13 |
| Comparative example 1 | 100 | — | — | — | — |
| Comparative example 2 | 99.95 | 0.004 | 0.046 | 0.03 | — |
| Comparative example 3 | 99.92 | 0.005 | 0.075 | 0.01 | — |

As can be seen from the results of Table 2, the $TiO_2$ without impurities was used for hydrogenation in Comparative example 1, the hydrogen gas at a low concentration was used for hydrogenation in Comparative example 2, and the hydrogenation was performed in Comparative example 3 by using the conditions that neither the hydrogenation time nor the hydrogenation temperature were within the scopes defined in the present disclosure; the results indicated that the ethylene degradation catalysts prepared in Examples 1-5 by using the preparation method of the present disclosure had a specific thickness of said disordered layer and a molar percentage of the $Ti^{3+}$ of the $TiO_2$ disordered layer in Ti elements.

Application Examples

The catalysts prepared in Examples 1-5 and Comparative examples 1-3 were applied in the ethylene decomposition reactions, wherein during the process of decomposing the organic volatile gases through the catalytic oxidation, the ethylene had a volume concentration of 700 ppm, the content of other gas $O_2$ was 10 v %, nitrogen gas $N_2$ was a balance gas, the total flow rate was 1,000 mL/min, and the hourly volume space velocity of organic volatile gas was 100,000 $h^{-1}$, the results were shown in Table 3.

Wherein the degradation efficiency %=(ethylene concentration at an inlet−ethylene concentration at an outlet)/ethylene concentration at an inlet×100%.

TABLE 3

|  | Degradation efficiency (%) | | | | | | | |
| --- | --- | --- | --- | --- | --- | --- | --- | --- |
|  | 100° C. | 150° C. | 200° C. | 250° C. | 300° C. | 350° C. | 400° C. | 450° C. |
| Example 1 | 0 | 0 | 2.5 | 12.5 | 20.3 | 66.3 | 84.1 | 92.7 |
| Example 2 | 1.2 | 1.3 | 2.6 | 13.6 | 21.6 | 65.4 | 82.6 | 90.2 |
| Example 3 | 0.6 | 0.8 | 2.8 | 14.4 | 22.7 | 64.2 | 83.0 | 92.7 |
| Example 4 | 0.5 | 0.2 | 2.3 | 13.7 | 25.8 | 68.2 | 80.4 | 91.4 |
| Example 5 | 0.1 | 0.5 | 2.4 | 10.7 | 24.8 | 63.7 | 81.5 | 92.3 |
| Comparative example 1 | 0 | 0 | 0 | 0 | 0 | 0 | 0 | 0 |
| Comparative example 2 | 0 | 0 | 1.0 | 5.0 | 14.2 | 45.3 | 56.3 | 66.7 |
| Comparative example 3 | 0 | 0.1 | 1.6 | 6.8 | 8.4 | 31.3 | 43.4 | 64.0 |

As can be seen from the results of Table 3, the use of titanium oxide of Comparative example 1, which has not been hydrogenated, there is no degradation efficiency for ethylene; the hydrogenation time, temperature and hydrogen concentration in the Comparative examples 2 and 3 are not within the ranges, and the prepared catalysts do not have the structure of the catalysts of the present disclosure, and the catalytic degradation effect of ethylene is inferior to that of the catalysts prepared in Examples 1 to 5 of the present disclosure. In addition, the titanium oxide of Comparative example 1 is subjected to calcination under the conditions of step (4) in Example 1 to obtain an anatase type crystal, and was hydrogenated according to the method of step (5) in Example 1, but the prepared catalyst does not contain the auxiliary agents $K_2O$ and $Na_2O$, and cannot obtain a thickness of the disordered layer and a molar percentage of the $Ti^{3+}$ of the $TiO_2$ disordered layer in Ti elements as defined in the present disclosure, thus cannot produce the desirable catalytic degradation effect of ethylene.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. An ethylene degradation catalyst, comprising $TiO_2$ crystals and auxiliary agents; wherein the crystalline form of $TiO_2$ crystal is an anatase type, and the surface of $TiO_2$ crystal is covered with a $TiO_2$ disordered layer containing surface hydroxyl groups,
    wherein the catalyst comprises $K_2O$ in an amount of 0.002-0.006 wt % and $Na_2O$ in an amount of 0.006-0.098 wt %, based on the total weight of the catalyst.

2. The catalyst of claim 1, wherein the $TiO_2$ disordered layer has a thickness of 1.8-3 nm.

3. The catalyst of claim 1, wherein a molar percentage of the $Ti^{3+}$ of the $TiO_2$ disordered layer in Ti elements is within a range of 2.15%-10.37%.

4. The catalyst of claim 1, wherein the catalyst comprises $TiO_2$ in an amount of 99.9-99.99 wt %, based on the total weight of the catalyst.

5. The catalyst of claim 1, wherein the auxiliary agents comprise $K_2O$ and $Na_2O$.

6. The catalyst of claim 1, wherein a molar percentage of the $Ti^{3+}$ of the $TiO_2$ disordered layer in Ti elements is within a range of 5.15%-8.66%.

7. A use of a catalyst of claim 1 in the catalytic degradation of ethylene.

8. A method of preparing the ethylene degradation catalyst of claim 1, comprising the following steps:
    (1) mixing a titanium source powder with an acid, and roasting an obtained mixture;
    (2) subjecting a product obtained from the roasting process to water leaching, and subsequently to a solid-liquid separation to obtain a Ti-containing filtrate;
    (3) subjecting the filtrate to hydrolysis and aging to obtain a metatitanic acid colloid comprising auxiliary agent elements which contain Na and K;
    (4) subjecting the metatitanic acid colloid to water washing, drying and calcination, to obtain nano-$TiO_2$ powder;
    (5) subjecting the nano-$TiO_2$ powder to hydrogenation, so as to prepare the ethylene degradation catalyst;
    wherein the titanium source powder is selected from the group consisting of spent SCR denitration catalysts containing $Na_2O$ and $K_2O$.

9. The method of claim 8, wherein the acid is concentrated sulfuric acid, preferably the acid has a concentration of 85-92 wt %.

10. The method of claim 8, wherein the conditions of mixing include a temperature of 20-30° C. and a time of 2-6 hours.

11. The method of claim 8, wherein the mass ratio of the titanium source powder to the acid is 1:(1.5-2).

12. The method of claim 8, wherein the roasting temperature is within a range of 150-300° C. and the roasting time is 30-90 min.

13. The method of claim 8, wherein the titanium source powder has an average particle size of 10-1,000 μm.

14. The method of claim 8, wherein the water leaching conditions comprise a temperature of 60-120° C. and a time of 60-180 min.

15. The method of claim 8, wherein the mass ratio of the product to the water used in the water leaching is 1:(2-6).

16. The method of claim 8, wherein the hydrolysis temperature is within a range of 80-110° C.; and the hydrolysis time is within a range of 2-5 h.

17. The method of claim 8, wherein the aging time is within a range of 15-30 h, and the aging temperature is within a range of 10-50° C.

18. The method of claim 8, wherein the drying temperature is within a range of 65-95° C. and the drying time is 60-120 min.

19. The method of claim 8, wherein the calcination temperature is within a range of 450-700° C., the calcination time is 2-8 h, and the temperature rise rate is 5-10° C./min.

20. The method of claim 8, wherein the hydrogenation condition comprises a hydrogenation temperature of 400-550° C., a hydrogenation temperature rise rate of 5-10° C./min, a hydrogenation time of 2-12 h, a hydrogen concentration of 90-100 vol %, and a hydrogen flow rate of 100-300 mL/min.

\* \* \* \* \*